April 22, 1969    R. H. CUSHMAN    3,439,536
SENSING DEVICE

Filed Feb. 6, 1967    Sheet 1 of 2

INVENTOR
R. H. CUSHMAN
BY Marn & Jangarathis
ATTORNEYS a
United States Patent Office 3,439,536
Patented Apr. 22, 1969

3,439,536
SENSING DEVICE
Robert Holbrook Cushman, Princeton Junction, N.J., assignor to Western Electric Company, Incorporated, New York, N.Y., a corporation of New York
Filed Feb. 6, 1967, Ser. No. 614,177
Int. Cl. G01l 5/04
U.S. Cl. 73—159                                   3 Claims

ABSTRACT OF THE DISCLOSURE

This invention relates to sensing devices. More particularly, this disclosure is directed to a device for sensing changes in the pressure of an air cushion or other pressurized fluid volume as an indication of certain conditions with respect to a body passing thereover. The sensing device of the present invention may be utilized to sense such conditions as the tension of a tape moving over the device and supported with respect thereto by the air cushion, the porosity of a strip passing thereover or the surface integrity of a strip of material passing thereover.

BACKGROUND OF THE INVENTION

Those concerned with the art of handling fast moving strips, whether they be flat Mylar or rolled strip steel, have been faced with protracted problems as to measuring conditions within the strip while it is moving.

In the field of capacitor winding, for example, it is desirable that provision be made for controlling the tensioning and supporting of flat metallized Mylar tapes so as to achieve more uniform, better registered, tighter capacitor windings.

Similarly, in quality control, it is often desirable to be able to sense the porosity of a product as a measure of its conformance to standards. The quality of paper, for example, may be monitored by continually sensing the porosity of a produced paper strip.

Surface integrity of material being produced is also a physical condition which can be valuable in quality control procedures. Thus, if variations in the otherwise planar surface of a product, such as glass, or metal strip may be measured as the product is produced, close and accurate control may be achieved in the production process.

Many different devices have been used and are presently in use to accomplish sensing functions such as the above-mentioned. With regard to the measuring of tape tension, for example, spring loaded lever arms have been used with rollers mounted on the pivoting ends for sensing engagement with the tape. Also, measurements have been taken of the electrical load on tape tensioning motors. These and other measuring devices have been used to a great extent, but, as is well known to those in the art, the poor response of the known devices for performing such measurement, and the incidence of additive errors which often can be greater than the value to be measured, have resulted in less than satisfactory performance.

A sensing device for measuring such values as the tension on a moving tape should embody the qualities of small size, rapid response, high sensitivity and an output which is sufficiently versatile to be used directly in any of the known types of control, display or recordings systems. These qualities heretofore have not been achieved in a commercially feasible, broadly useful apparatus.

SUMMARY OF THE INVENTION

It is an object of the present invention therefore to provide an apparatus for sensing measurable characteristics of a strip moving with respect thereto, which apparatus affords the advantages of rapid response, high sensitivity and improved resolution.

Another object of the present invention is to provide an apparatus for sensing measurable characteristics of a strip moving with respect thereto, which apparatus is relatively small in size.

A further object of the present invention is the provision of an apparatus for sensing measurable characteristics of a strip moving with respect thereto, which apparatus may be used for measuring the tension in a fast moving tape.

A still further object of the present invention is the provision of an apparatus for sensing measurable characteristics of a strip, the output of which may be used in conventional control, display or recording systems.

These and other objects are achieved by the present invention wherein there is provided a pressure sensing device comprising a chamber containing a volume of pressurized gas, one wall of the chamber being a surface of a strip of material, the characteristics of which are to be measured, and at least one transducer for sensing variations in the pressure of the gas in the chamber and for producing a useable electrical output signal in response to such pressure changes.

The present invention is predicated upon the theory that changes in the pressure of a volume of gas can be measured quickly and accurately, and that changes in volume of a pressurized gas may be used to indicate many characteristics of a material exposed to the gas under pressure. Thus, if one wall of a chamber containing a pressurized gas is the surface of a strip of material, and the other chamber walls are fixed, variations in the pressure of the gas in the chamber may be attributed directly to some change in the surface or other characteristic of the strip of material which affects the overall volume of the chamber. For example, if a strip of metal is being passed over a pressurized gas containing chamber, one surface of the metal forming one wall of the chamber, imperfections in the metal surface such as dimples or porous sections will vary the volume of the chamber and therewith the pressure of the gas container therein. Measurement of such pressure changes, therefore, are indicative of the surface condition of the moving strip.

Similarly, changes in the amount of resistance to the flow of a gas around a moving strip may also be indicative of a characteristic of the strip as will be discussed more fully hereinafter.

The exact nature of this invention with its many attendant advantages will be readily appreciated and better understood by reference to the following detailed description thereof when considered in connection with the accompanying drawings in which like reference numerals designate like parts throughout the figures thereof and wherein:

BRIEF DESCRIPTION OF THE DRAWINGS

FIG. 4 is a cross-sectional elevational view similar to the view of FIG. 3, but of another embodiment of a sensing device according to the present invention; and FIG. 5 is a cross-sectional elevational view similar to the views of FIGS. 3 and 4, but of yet another embodiment of a sensing device according to the present invention.

DESCRIPTION OF PREFERRED EMBODIMENTS

Figure 1:
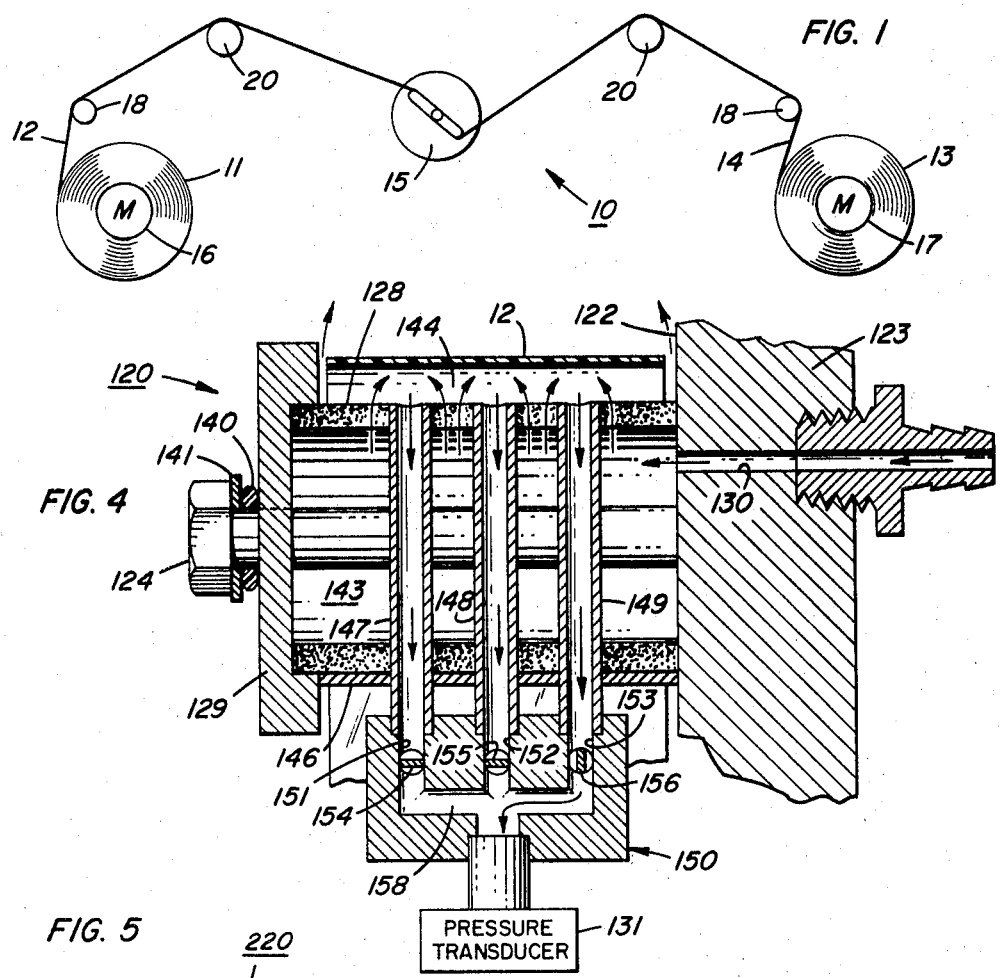
FIG. 1 is a schematic elevational view of a sensing device according to the present invention in use as a tape tension sensor in a capacitor winding device.

Referring now to FIG. 1, there is shown schematically a capacitor winding apparatus designated generally by the reference numeral 10, which capacitor winding apparatus is typical of the apparatus with which the present invention may be used. The capacitor winding apparatus 10 includes a first tape roll 11 of suitable clear capacitor tape 12 such as Mylar, a second tape roll 13 of metallized capacitor tape 14 such as metal coated Mylar, and a mandrel 15 for winding a capacitor having alternate layers of clear and metallized tape as is well known in the art. The mandrel 15 is driven by a motor (not shown) and each of the tape rolls 11, 13 are provided with a tensioning motor 16 and 17, respectively, to control the speed of unwinding the tape and the tension on the tape as it is being wound. Both the clear tape and the metallized tape pass over air bearings 18 such as those which are known in the art, and sensing devices according to the present invention, designated generally by the reference numeral 20.

As shown in relation to the capacitor winding apparatus 10, the pressure sensing devices 20 according to the present invention are utilized to sense the dynamic tension of the capacitor forming tapes 12 and 14 as they pass from the tape rolls 11 and 13, respectively, to the mandrel 15. The sensed value of dynamic tape tension may be used to control the tension motors 16 and 17 for rolls 11 and 13, respectively, to serve as an indication of the capacitor value, which value is related to the tightness of winding, or to identify flows in the tape quality as it passes over the sensing device.

Figure 2:
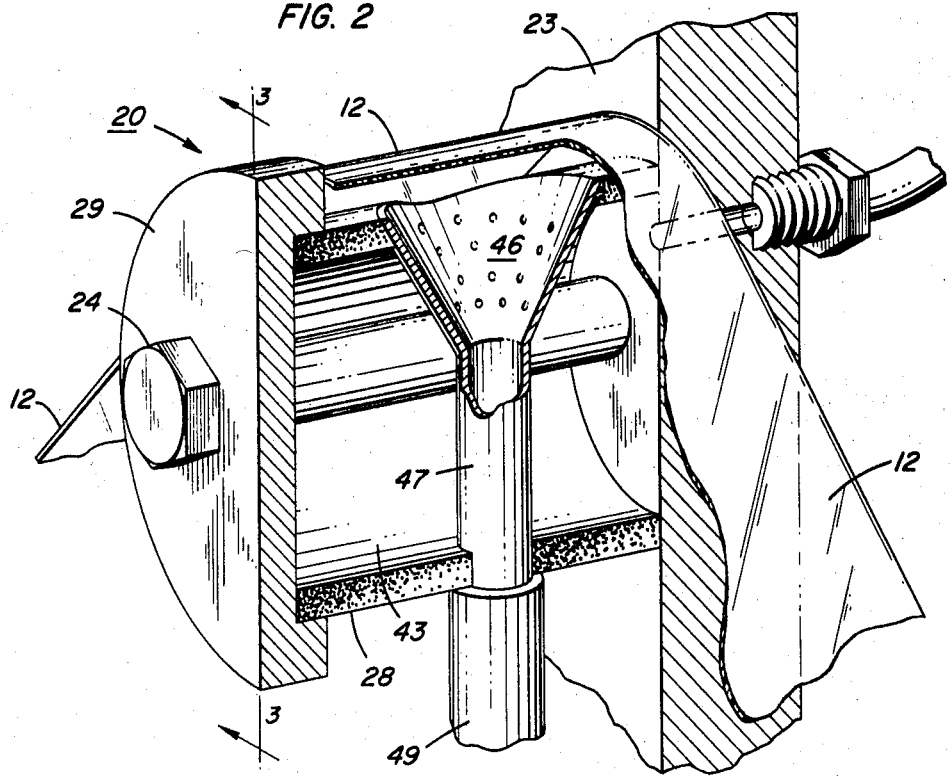
FIG. 2 is a perspective view partially cut away, of a sensing device according to the present invention with a tape passing thereover.
Figure 3:
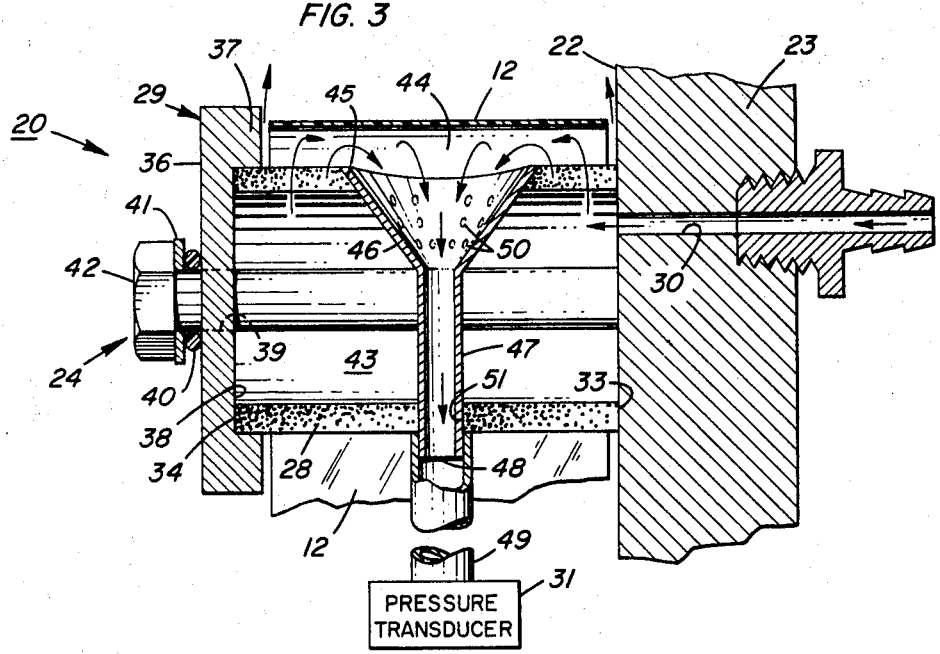
FIG. 3 is a cross-sectional elevational view through the plane 3—3 of FIG. 2.

As can be seen in FIGS. 2 and 3, an embodiment of a pressure sensing device 20 according to the present invention is mounted against surface 22 of support wall 23 and secured thereto by appropriate securing means such as mounting bolts 24. Bolts 24 extend through pressure sensing device 20 perpendicularly to the surface 22 of wall 23 and are rigidly received in threaded bores in wall 23.

Pressure sensing device 20 generally comprises a cylindrical porous "air-bearing" 28, an end support cap 29, an air input conduit 30 through which pressurized air is provided, a pressure sensitive remote mounted transducer 31 and structure for providing fluid communication between the sensing area of the device, to be further described, and a pressure transducer 31.

Air bearing 28 is a generally cylindrical member having a first edge 33 at one end and second edge 34 at the opposite end. It may be a conventional porous bronze bearing with the oil removed, it may be of perforated sheet metal, or it may be of any other suitable structure which will allow the passage of air therethrough. In assembled position, first bearing edge 33 is in engagement with surface 22 of wall 23 and the bearing is oriented with its longitudinal axis perpendicular to surface 22.

End support cap 29 comprises a disc-shaped wall 36 having a perpendicularly extending annular flange 37 around its periphery. The inner diameter of annular flange 37 is substantially equal to the outer diameter of bearing 28 so that when the device is assembled, second edge 34 of bearing 28 is received within the annular flange 37 and abuts the inner surface 38 of wall 36 of cap 29. A suitable aperture 39 is provided in cap 29 for receiving bolts 24 therethrough so as to rigidly secure the sensing device 20 in operating position. When assembled, the interior of bearing 28, end cap 29 and surface 22 of wall 23 define a first chamber 43 into which pressurized air is introduced through conduit 30. In that the space within bearing 28 is ordinarily pressurized, the aperture 39 is sealed against leakage by the provision of an O-ring 40 and a washer 41 mounted on bolt 24 between the bolt head 42 and the outer surface of cap 29.

As can be best seen in FIG. 3, an opening 45 is provided in the cylindrical wall of bearing 28 to receive the conical end 46 of a sensing funnel 47 which is connected at its other end 48 to a tube 49. Tube 49, in turn, connects funnel 47 with pressure transducer 31. The conical end 46 of funnel 47 is provided with suitable apertures 50 which may be slits, perforations or the like, to allow the passage of air therethrough. Compressed air, which is introduced through conduit 30 into chamber 43 and thereafter passes through bearing 28 and apertures 50 in funnel 47, sets up an air cushion on which tape 12 is supported as it moves over air bearing 28. The divergent portion of conical end 46 is secured flush with the outer surface of bearing 28. The convergent portion of end 46 extends inwardly of the bearing 28 and is therein joined with the main portion of funnel 47 which extends through and a short distance beyond an aperture 51 provided in bearing 28 diametrically opposite opening 45.

That portion of main funnel portion 47 which extends outwardly beyond bearing 28 defines a nipple for telescopically receiving one end of the tube 49 which continues to transducer 31 thus placing the transducer 31, tube 49 and funnel 47 in fluid communication.

In operation, the tape 12 passes over sensing device 20 covering approximately one-tenth of the periphery of air bearing 28. The amount of wrap of tape 12 around bearing 28 is not critical so long as there is sufficient wrap to cover the conical end 46 of sensing funnel 47. The space thus bounded by the inner surface of tape 12, the outer surface of bearing 28 which is under tape 12, the surface 22 of wall 23 and the inner surface of flange 37 defines an open-ended second air chamber 44 for confining an air cushion upon which tape 12 rides.

Compressed air for the tape supporting air cushion is supplied to first air chamber 43 through passage 30 in wall 23. Thereafter, the air in first air chamber 43 passes through porous bearing 28 and the apertures 50 in the conical portion 46 of funnel 47 to provide the air cushion upon which tape 12 rides as it passes over the sensing device. The required pressure of the air supplied to chamber 43 is dictated by the nature of the porous material being used and the pressure sensitivity range of the transducer. In this regard, it has been found that a transducer pressure range of from 0 to 6 pounds per square inch, corresponding to no load and maximum load on the tape, respectively, can be achieved by providing a source pressure of approximately 60 p.s.i. which may be suitably throttled to compensate for various porous materials.

As can be best seen in FIGS. 2 and 3, there are two possible paths of escape for the air which comprises the air cushion in chamber 44, between the edges of tape 12 and the surfaces of wall 23 and annular flange 37, and peripherally around air bearing 28. Further, the fluid pressure of the air cushion at any one time is transmitted through funnel 47 and tube 49 to transducer 31 whereat it is sensed. As the tension on tape 12 varies, therefore, it will have a tendency to either move closer to or away from the surface of air bearing 28, thereby decreasing or increasing the volume of chamber 44. Thus, on an increase in tape tension, the tape will move closer to bearing 28 and an increase in resistance to the escape of air from the air cushion will occur, thus increasing the pressure of the air cushion which will be sensed by the transducer 31. The transducer will generate a signal in response to the air pressure variation, which signal can be used as desired. Conversely, as tension on the tape decreases, the resistance to the escape of air from the air cushion will be decreased correspondingly, thus causing a decrease in the pressure of the air cushion which, as before, will be sensed by the transducer 31 and result in the generation of an appropriate signal.

Virtually any of the known pressure transducers may be used in this device. For example, the particular transducer being selected for this embodiment is a variable resistance potentiometer pressure transducer having a range of 0–6 pounds per square inch which would correspond to conditions of no tape tension to maximum tension, respectively.

It is to be recognized that a significant feature of the structure of the present invention is the capability of isolating frequencies during the transmission of pressure pulses from the air cushion to the pressure transducer so as to enable selective analysis of tape tensions through a broad range of loading frequencies. Thus, the length and diameter, hence the shape, of funnel 47 and therewith tube 49 can be utilized to act as a low pass, high pass or band pass pulse frequency filter. For example, a long, small diameter tube will provide a long time constant for the passage of a sensed pressure variation from the air cushion chamber 44 to the transducer 31. This long time constant will cause the transducer output to be proportional to the low frequency or average tension variations of the tape 12. As the funnel 47 and tube 49 are shortened and/or as their diameter is increased, approaching as a limit the diameter of the sensing element of pressure transducer 31, the upper frequency response is raised so that transducer output will reflect high frequency as well as the low frequency tension variations. The selective utilization of this capability allows analyses of tape tensions in terms of both their frequency and magnitude, the advantage of which capability is obvious to those skilled in the art.

Referring now to FIG. 4, there is shown another embodiment of a dynamic pressure sensor 120 according to the present invention which enables the sensing of pressure on a tape 12 at a plurality of transverse points as it passes over the sensor.

The basic structure of this embodiment is exactly the same as that shown in the embodiment of FIGS. 2 and 3. That is, a generally cylindrical porous bearing 128 having an end cap 129 is mounted normally to the surface 122 of a wall 123 and secured thereto by a mounting bolt 124 which extends through end cap 129 into a threaded aperture in wall 123. As before, the end cap 129, bearing 128 and surface 122 of wall 123 define a chamber 143 for receiving compressed air through a conduit 130 in wall 122. The compressed air passes from chamber 143 through porous bearing 128 to form an air cushion 144 on which tape 12 is supported as it passes over the pressure sensing device 120. Similar to the embodiment of FIGS. 2 and 3, a washer 141 and an O-ring 140 are provided between the outer surface of cap 129 and the head of mounting bolt 124 to preclude leakage of air from chamber 143.

Tape 12 in this embodiment also wraps around approximately one-tenth of the peripheral surface of bearing 128. In order to afford greater air flow control and sensor response, however, there has been provided a cylindrical cover 146 around the remaining nine-tenths of the outer surface of bearing 128. It is to be recognized that cover 146 is not required. However, when provided, a more accurate definition of the bounds of the air cushion in second chamber 144 is achieved.

The embodiment of FIG. 4 is provided with three pressure sensing elements 147, 148 and 149 which are uniformly spaced transversely of the direction of movement of tape 12. The sensing elements 147, 148 and 149 are mounted flush with the tape adjacent surface of bearing 128 and extend therethrough into and through chamber 143, through the surface of bearing 128 at a point diametrically opposed to the tape adjacent surface, and into a pressure sensing manifold 150.

Manifold 150 has three bores 151, 152, 153 in which elements 147, 148 and 149 are received respectively. Further, each bore 151, 152 and 153 is provided with a suitable valve 154, 155 and 156, respectively, which can seal their respective bores selectively. The three bores 151, 152 and 153 lead to a common pressure manifold 158 which is in communication with pressure transducer 131.

The operation of this embodiment is exactly the same as that for the embodiment of FIGS. 2 and 3, with the advantageous addition of the capability to selectively take pressure readings transversely across the width of tape 12 by selectively manipulating valves 154, 155 and 156. Thus, pressure sensing at any one point across the tape width may be accomplished by closing two of the valves, e.g., 154, 155, and leaving the third valve 156 open. The pressure of the air cushion 144 above sensing element 149 will then be transmitted therethrough to bore 153 and manifold 158 to transducer 131.

Similarly, if it is desired to get an air cushion pressure reading across the entire tape width, this can readily be accomplished by opening the three valves 154, 155 and 156 to allow the pressures sensed by each of the sensing elements 147, 148 and 149 to comingle in manifold 150 and thereafter be sensed by transducer 131.

A still further embodiment of the present invention is shown in FIG. 5. This embodiment of a dynamic pressure sensing device 220 incorporates a transducer 231 mounted directly within the body of the sensing device and in communication with a first chamber 243.

Referring now to FIG. 5, there can be seen a dynamic pressure sensing device 220 comprising a generally cylindrical core 229 having a porous bearing 228 mounted therearound. An annular channel 227 is provided around a portion of the periphery of core 229, approximately one-tenth of the periphery is satisfactory, to cooperate with the inner surface of bearing 228 to define a chamber 243.

Air is provided to chamber 243 through a bore 230 in core 249 and any migratory fluctuations in the air pressure from the compressed air source (not shown) are dampened by the pressure of a thin bore metering valve 232 mounted in the bore 230. The air provided to chamber 243, which may be at a pressure of approximately 60 p.s.i., passes through the porous bearing 228 to define an air cushion 244 upon which tape 12 rides as it passes over sensing device 220.

A recess 270 is provided in core 229 extending inwardly from annular channel 227, in which recess is mounted pressure transducer 231 in a range of 0 to 60 p.s.i. A bore 271 is provided from the wall opposite surface of core 229 to recess 270 to accommodate the passage of electrical leads from the transducer out of the core 229.

This embodiment differs from the embodiments of FIGS. 2–4 in that the pressure sensed by transducer 231 is that of chamber 243 rather than air cushion chamber 244. Thus, as the tension on tape 12 is varied, the resistance to the flow of air outwardly from air cushion 244 will vary thus varying the rate of passage of air through bearing 228, which in turn is reflected in the pressure in chamber 243. Obviously, this embodiment will not afford the response or sensitivity which can be achieved by the prior embodiments in that the operating range of the transducer is in the nature of 50 to 60 p.s.i., a span of approximately 17% of its full range. Whereas, in the other embodiments, the operating range of the transducer is 0–6 p.s.i. which corresponds to the no load, maximum load condition on the tape, thus utilizing virtually the full range of the transducer as operating range.

This embodiment is particularly useful, however, in those situations where a high degree of accuracy is not necessary and compactness is of prime importance.

The invention which has been hereinabove disclosed is, as will quickly be recognized by those having ordinary skill in the art, a valuable addition to the art of sensing devices in that it may be used not only to measure the tension of a moving tape, but may also be used to sense the porosity of a strip of tape passing thereover, or the surface integrity of a strip of material passing thereover. The invention may also be used in a commercial as well as a laboratory environment to measure such values as steady tape tension, magnitude of starting tension and duration, transient phenomena, standing wave phenomena, system resonances, bearing eccentricities, misalignment and many other systems characteristics which may be of interest.

Obviously, many modifications and variations of the present invention are possible in the light of the above

What is claimed is:

1. An apparatus for measuring the tension of a tape moving thereover, comprising:
   a support means having a first surface thereon;
   a generally cylindrical element having one end abutting said first surface of said support means, said generally cylindrical element being of porous material;
   a support cap abutting the other end of said generally cylindrical element, said support cap being larger in outer dimension than the outer dimension of said generally cylindrical element;
   securing means for rigidly maintaining said support cap in end abutting engagement with said cylindrical element and said cylindrical element in end abutting engagement with said first surface of said support means;
   a first chamber defined by the cooperation of said first surface of said support means, the inner surface of said generally cylindrical element and said support cap;
   a second chamber defined by the cooperation of said first surface of said support means, the outer surface of said generally cylindrical element, said support cap and a surface of said moving tape;
   means for providing compressed air to said first chamber, said air passing through the pores of said porous material of said cylindrical element to said second chamber;
   said compressed air in said second chamber acting as an air-cushion for supporting said tape;
   a tube extending from said second chamber through said first chamber;
   pressure transducer means operatively connected to said tube; and
   said tube for communicating said second chamber and said pressure transducer to operate said transducer in response to pressure changes in said air-cushion in said second chamber.

2. An apparatus for measuring the tension on a tape moving thereover as claimed in claim 1 and further including:
   cover means for covering a portion of the outer surface of said generally cylindrical element, said cover means for precluding the passage of air through the pores of said porous material other than into said second chamber.

3. An apparatus for measuring the tension on a tape moving thereover as claimed in claim 1 wherein said tube comprises a frequency filter means for isolating frequencies of pressure variations of said air in said second chamber.

References Cited

UNITED STATES PATENTS

| | | | |
|---|---|---|---|
| 3,075,679 | 1/1963 | Wadey | 226—108 |
| 3,159,028 | 12/1964 | Hornbostel | 73—159 |
| 3,201,985 | 8/1965 | Williams | 73—37.7 XR |
| 3,332,281 | 7/1967 | Spangler. | |

FOREIGN PATENTS

| | | |
|---|---|---|
| 705,611 | 3/1965 | Canada. |
| 703,132 | 1/1954 | Great Britain. |

LOUIS R. PRINCE, *Primary Examiner.*

J. NOLTON, *Assistant Examiner.*

U.S. Cl. X.R.

73—37.7, 38